United States Patent [19]

Barrett

[11] Patent Number: 5,435,414

[45] Date of Patent: Jul. 25, 1995

[54] BATCH RECIRCULATING SYSTEM FOR HIGHLY VISCOUS AND SEMI FLUID LUBRICANTS

[75] Inventor: Charles D. Barrett, Hoffman Estates, Ill.

[73] Assignee: Castrol Ltd., Wiltshire, England

[21] Appl. No.: 177,777

[22] Filed: Jan. 5, 1994

[51] Int. Cl.[6] .................. F01M 1/18; F01M 11/10
[52] U.S. Cl. ................... 184/6.4; 184/6.24; 184/103.2; 184/108; 184/6
[58] Field of Search ............ 184/6.4, 6.21, 6.24, 184/103.1, 103.2, 108, 6

[56] References Cited

U.S. PATENT DOCUMENTS

| | | |
|---|---|---|
| 1,207,067 | 12/1916 | Nugent . |
| 1,220,231 | 3/1917 | Jack . |
| 1,658,362 | 2/1928 | Walker . |
| 1,661,825 | 3/1928 | Hendrickson . |
| 2,081,632 | 5/1937 | McBain . |
| 2,792,912 | 5/1957 | Kangas .................. 184/103.2 |
| 3,150,548 | 9/1964 | Roberts .................... 184/6 |
| 3,286,791 | 11/1966 | Cofer et al. ............... 184/6 |
| 3,678,631 | 7/1972 | Payne et al. ............. 184/6.4 |
| 4,105,092 | 8/1978 | Zeidler et al. ........... 184/6.4 |
| 4,169,519 | 10/1979 | Hirt et al. . |
| 4,171,034 | 10/1979 | Gallant . |
| 4,444,292 | 4/1984 | Brown et al. . |
| 4,615,413 | 10/1986 | Stevenson . |
| 4,844,202 | 7/1989 | Maresko . |
| 4,848,518 | 7/1989 | Ornberg et al. . |

FOREIGN PATENT DOCUMENTS 0515326 11/1992 European Pat. Off. ......... 184/103.1

OTHER PUBLICATIONS

J. George Wills, Lubrication Fundamentals, 1980, pp. 160–182.

Primary Examiner—Thomas E. Denion
Attorney, Agent, or Firm—McAndrews, Held & Malloy, Ltd.

[57] ABSTRACT

A lubricating recirculation system for use with highly viscous lubricants and semi-fluid lubricants such as high viscosity base oil gels and greases. The system includes a bulk lubricant container for storing fresh lubricant that is applied to the use points of the mechanisms as controlled by a controller such as programmable logic controller. After application to the mechanism components, the lubricant falls therefrom and accumulates on guards or channels which help to funnel the lubricant into a spent lubricant holding tank. Sensors in both the bulk lubricant container and the spent lubricant holding tank, in connection with the controller, monitor the level of lubricant in both tanks and activate a transfer pump when the level of lubricant in either tank reaches a certain level. Upon activation of the transfer pump, the spent lubricant is drawn from the spent lubricant holding tank and forced through a filtering device to remove impurities and is then conveyed back to the bulk lubricant container for reapplication to the use points.

17 Claims, 2 Drawing Sheets

BATCH RECIRCULATING SYSTEM FOR HIGHLY VISCOUS AND SEMI FLUID LUBRICANTS

BACKGROUND OF THE INVENTION

The present invention relates to an apparatus for recirculating highly viscous or semi-fluid lubricants that are used to lubricate various machine components of a mechanism. More specifically, the present invention relates to an apparatus for recirculating highly viscous or semi-fluid lubricants in batch fashion.

Two types of systems presently exist for lubricating machine components. The first is a total loss lubrication system (once through) where fresh clean lubricant is continuously applied to the machine components of the system. The second is a recirculating system where a liquid lubricant is initially applied to the machine components of a system at its use points. After the lubricant contacts the components, spent lubricant is collected in a sump. The spent lubricant is then sent through a filter to remove the bulk of impurities before it is recirculated for reapplication to the system use points. Current recirculating systems usually operate in a continuous or near-continuous fashion and thus low to moderately high viscosity fluids are usually recirculated. Common machine components requiring lubrication include open and semi-open gear drives, bushings, and plain bearings, rolling element bearings, slideways and rams.

It is acknowledged in the art that the ideal method of lubricating most, if not all, types of machine components is through the use of a recirculating oil system. However, overall design and/or application restrictions often prohibit the practical incorporation of such a system of lubrication. As a result, at present, where it is impractical to install a recirculating oil system, total loss lubrication systems are commonly installed.

Because of various design and application restrictions, many industrial machines employ a total loss lubrication system. In mechanisms which are subjected to extremely high shear forces and temperatures, lower viscosity fluids may not adequately protect the rams, bushings, open and semi-open gear drives, plain bearings, rolling element bearings, slideways, and other components of the mechanism because lower-viscosity lubricants can break down and provide minimal or no protection for the machine components. Highly viscous, semi-fluid lubricants such as greases or high viscosity base oil gels are used because they are more resistant to breakdown. However, because of the difficulties in recirculating these higher viscosity lubricants, the components are commonly lubricated by a total loss system.

For example, one industrial machine that suffers from these restrictions is the cover lifting and rotating mechanism of an electric arc furnace. The cover lifting and rotating mechanism, contained in a steel mill furnace and used to supply continuous metal casters, may employ rams, bushings and other components that require highly viscous or semi-fluid lubricants in order to ensure safe and reliable operation.

As systems requiring highly viscous or semi-fluid lubricants use the total loss lubrication system, fresh clean lubricant must be continuously applied to their components at a desired rate. This makes these systems much more costly to operate than recirculating oil systems, from both an initial and spent lubricant disposal cost basis. In addition, total loss lubrication can waste non-renewable resources such as mineral oil based lubricants, and can be environmentally undesirable. Thus, a recirculating system for semi-fluid lubricants would be less costly to operate and environmentally more desirable.

SUMMARY OF THE INVENTION

Therefore, one object of the present invention is to provide an apparatus to lubricate, in a recirculating manner, machine components that currently are lubricated by the total loss lubrication (metered total loss) method, such as open and semi-open gear drives, bushings and plain bearings, rolling element bearings, slideways, and rams.

Another object of the present invention is to provide an apparatus that is specifically directed to lubricating machine components with semi-fluid lubricants such as greases or high viscosity base oil gels.

It is a further related object of the present invention to provide apparatus that will allow such systems to overcome design and/or application restrictions and allow such components to utilize a system that will recirculate the semi-fluid lubricants or higher viscosity fluids in batch fashion.

A further object of the present invention is to provide a system that provides continuous, near-continuous or intermittent application of semi-fluid lubricants such as greases or higher viscosity fluids such as high viscosity base oil gels to the components of a system, and recirculate these semi-fluid lubricants or higher viscosity fluids in batch fashion.

Another object of the present invention is to lubricate an electric arc furnace, and particularly the cover lifting and rotating mechanism of an electric arc furnace, in a continuous, near-continuous, or intermittent fashion.

A further object of the present invention is to provide apparatus for lubricating the components of a steel mill electric arc furnace with high-viscosity lubricants and recirculating the lubricants in batch fashion.

It is yet a further object of the present invention to provide a system that can be incorporated with newly installed systems or retrofitted into existing systems to convert them from a total loss system to a recirculating system at minimal expense, and without major changes to existing hardware.

It is still a further object of the present invention to provide a system for recirculating semi-fluid lubricants and higher viscosity lubricants that is more cost efficient than other systems.

It is yet another object of the present invention to provide a system for recirculating semi-fluid lubricants and higher viscosity fluids that minimize the environmental problems associated with total loss systems.

Accordingly, a first aspect of the invention meeting one or more of the above objects is a system for delivering and recirculating high viscosity lubricants to a mechanism employing such lubricants. The system comprises a bulk lubricant container, at least one orifice, a spent lubricant holding tank, at least one guard, a transfer pump, level sensors for the tanks, and a controller.

The bulk lubricant container holds a supply of clean lubricant to be applied to at least one use point of the mechanism. Each orifice feeds the clean lubricant to the use points of the mechanism which are to be lubricated. The guards are for collecting the spent lubricant after it escapes from the use points and channeling the spent lubricant to a spent lubricant holding tank. The transfer pump is used for conveying the spent lubricant from the spent lubricant holding tank through a filter for removing impurities and returning the clean lubricant to the bulk lubricant container.

The bulk lubricant container has at least one sensor for signalling when the level of clean lubricant contained therein is less than a predetermined minimum. The spent lubricant holding tank has at least one sensor for signalling when the level of spent lubricant contained therein is greater than a predetermined maximum. The controller monitors the readings from the level sensors in the bulk holding container and the spent lubricant holding tank and activates the transfer pump when the level of the spent lubricant in the spent lubricant tank exceeds the predetermined maximum or the level of the clean lubricant in the bulk lubricant container is less than the predetermined minimum.

According to a second aspect of the invention, a system is provided for recirculating high-viscosity lubricants in batch fashion. The system comprises a controller, at least one bulk lubricant container, a first pump, at least one orifice, a spent lubricant holding tank, and a second pump. The controller monitors and controls the flow of lubricant through the system. The first pump is associated with the controller for removing a controlled amount of lubricant from the bulk lubricant container for lubricating at least one component of a mechanism requiring lubrication. The orifice applies the lubricant to at least one component of the mechanism. The spent lubricant holding tank is for collecting spent lubricant after it escapes the mechanism requiring lubrication. The second pump is associated with the controller for pumping the spent lubricant from the spent lubricant holding tank through a plurality of filtering devices to the bulk lubricant container when the bulk lubricant container is depleted.

A third aspect of the invention is a method for delivering and recirculating high viscosity lubricants to a mechanism requiring lubrication. The method comprises the steps of holding clean lubricant to be applied to at least one use point of a mechanism requiring lubrication in a bulk lubricant container; applying the clean lubricant from the bulk lubricant container to at least one use point of the mechanism; and collecting the spent lubricant which escapes from the use point. The spent lubricant is channeled to a spent lubricant holding tank, conveyed from the spent lubricant holding tank through a filter for removing impurities, and returned as a clean lubricant from the spent lubricant tank to the bulk lubricant container.

The flow is regulated by determining when the level of clean lubricant contained in the bulk lubricant container is less than a predetermined minimum, or when the level of spent lubricant contained in the spent lubricant tank is greater than a predetermined maximum. The clean lubricant is returned from the spent lubricant tank to the bulk lubricant container when the level of the spent lubricant in the spent lubricant tank exceeds the predetermined maximum or the level of the clean lubricant in the bulk lubricant container is less than the predetermined minimum. Transferring the lubricant from the spent lubricant tank to the bulk lubricant container only when the former is essentially full or the latter is depleted is referred to herein as a batch process or batch transfer of the lubricant.

DETAILED DESCRIPTION OF THE PREFERRED EMBODIMENTS

Figure 1:
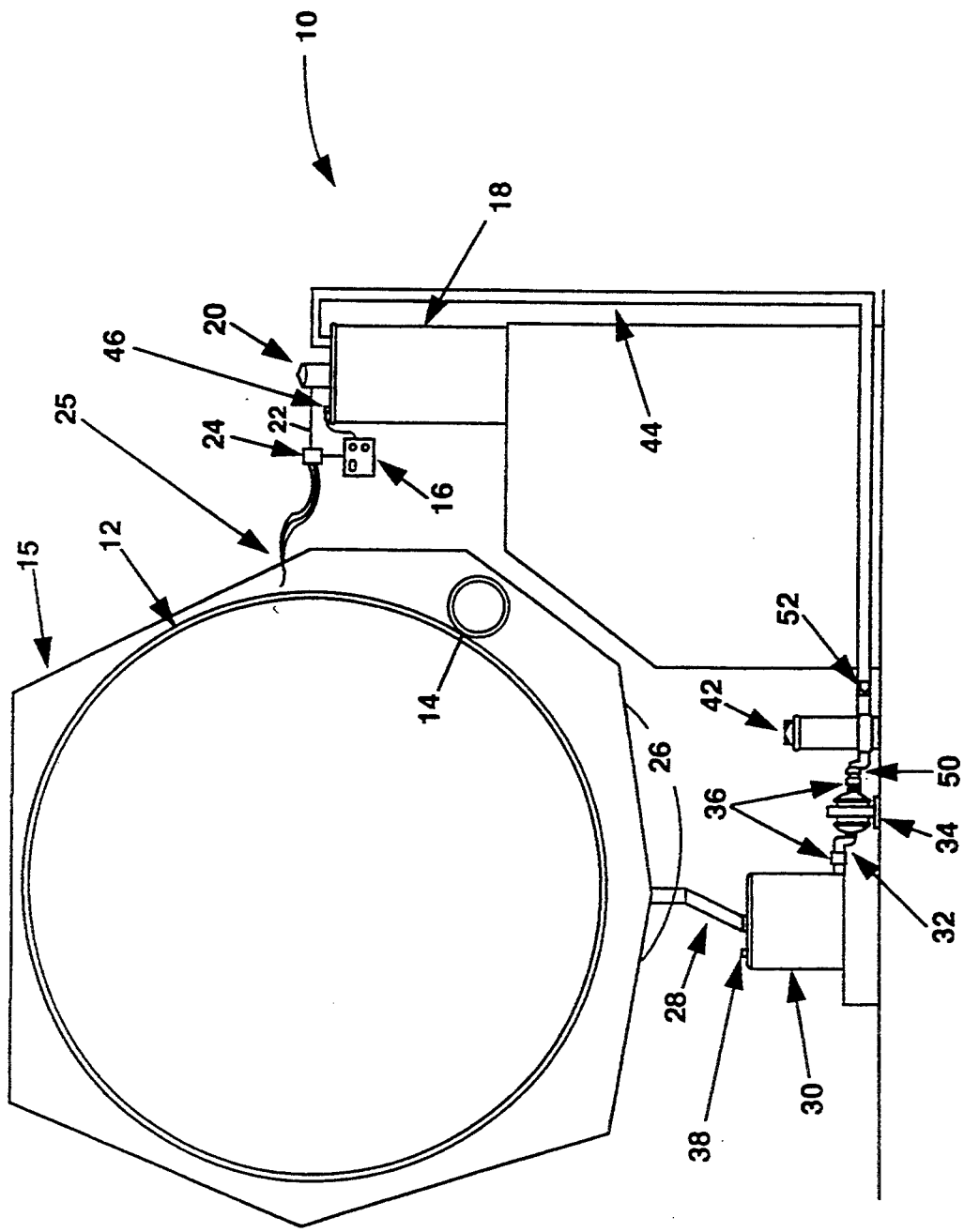
FIG. 1 is a schematic of a preferred embodiment of the lubricant recirculating system according to the present invention.
Figure 2:
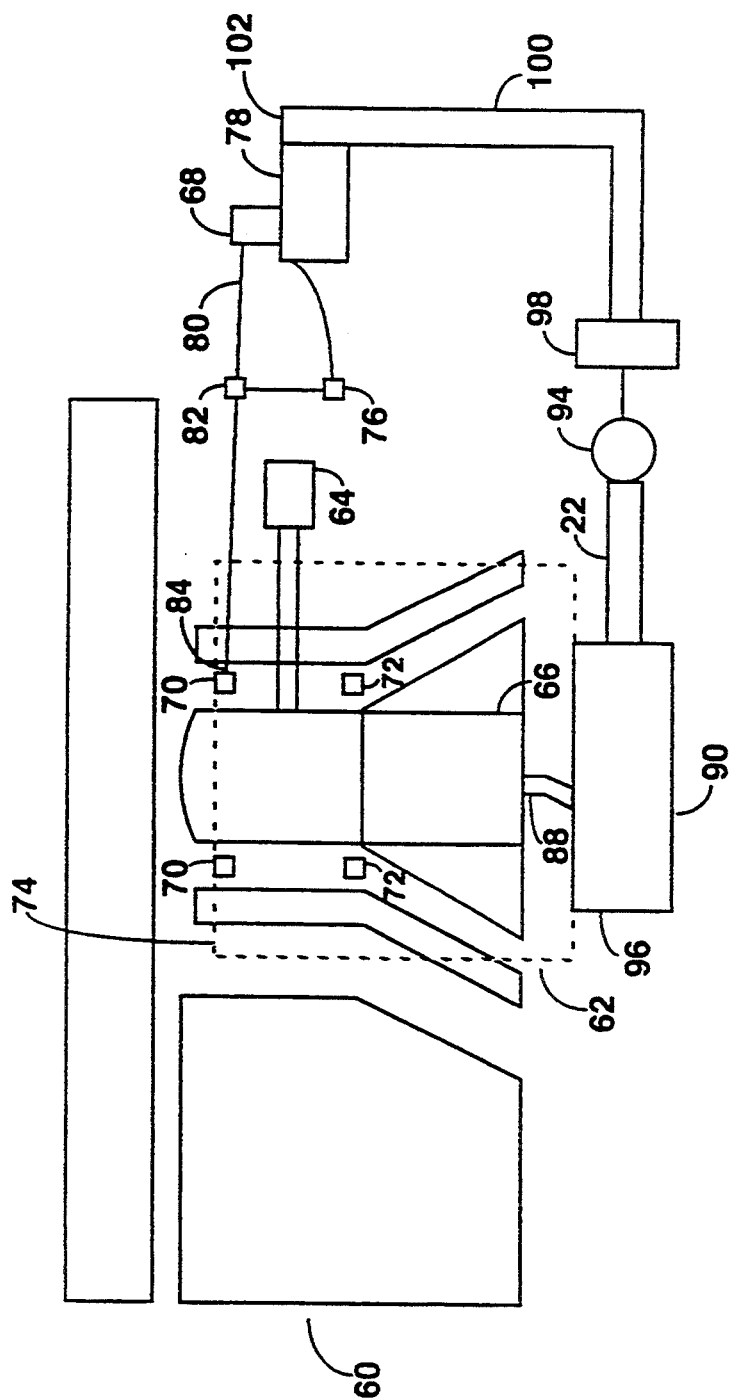
FIG. 2 is a schematic of the lubricant recirculating system of the present invention as utilized with the cover lifting and rotating mechanism of a steel mill electric arc furnace.

FIGS. 1 and 2 are schematic representations of the present invention and illustrate the versatility and flexibility of the present invention. The present invention is intended for use with new machines. However, it can also be retrofitted onto existing machines that currently use a total loss lubrication system, to convert them into metered loss recirculation systems at minimal expense and with very minor hardware changes.

Turning to FIG. 1, the batch recirculating system of the present invention is generally indicated by reference number 10, and can have a plurality of lubricated components. These components include gears, pinions, rams, bushings, slideways or bearings. In FIG. 1 a gear 12 and pinion 14 are shown. The gear 12 and pinion 14 are contained in a gear enclosure generally indicated by reference number 15. The gear enclosure or housing 15 helps maintain the lubricant in close proximity with the machine components.

The operation of the present invention is controlled by a system controller 16 which is preferably a digital computer or a programmable logic controller (PLC). The system controller 16 controls and monitors the flow of lubricant to the various machine components. In the present invention the lubricant includes semi-fluid lubricants such as greases or higher viscosity lubricants such as high viscosity base oil gels.

The lubricant that is used to lubricate the system components is initially stored in a bulk lubricant container 18. The system controller 16 regulates and controls the application of lubricant from the bulk lubricant container 18 to the use points of the gear 12 and the pinion 14. The controller 16 allows for application of the lubricant in a continuous, near-continuous or intermittent fashion depending upon the specifications of the system.

When the system is in operation, the controller 16 activates a lubricant supply pump 20 which pumps a pre-selected amount of lubricant from the bulk lubricant container 16 through a conduit 22 to a lubricant metering device or devices 24 which regulate the pressurized flow of lubricant. The lubricant supply pump 20 is preferably a high pressure pump. As a result of the metering device 24, a controlled volume of lubricant is sprayed or otherwise introduced to the various components of a mechanism requiring lubrication, such as the gear 12 and the pinion 14, through spray nozzles 25. The lubricant can also be applied to the components through the use of conduits or orifices which are well known in the art. The actual point of lubricant application may be to the pressure flanks of the large diameter gear 12 as illustrated in FIG. 1, to the flanks of the smaller gear or pinion, or in the case of bearings or rams, directly to the internal components.

Once the lubricant is introduced to the primary machine component(s), it may be conveyed via pipes or hoses (not shown) to other secondary components (not shown) such as bearings or rams. After the lubricant has been applied to the machine components, spent lubricant will fall therefrom and collect on a plurality of guards or channels 26 of the gear enclosure 15 or housing. These channels, conduits or guards 26, sometimes referred to herein collectively as "guards", are used to facilitate the collection of the spent lubricant.

Semi-fluid lubricants such as greases and high viscosity based oil gels do not have the flow characteristics of lower viscosity machine oils, thus the guards 26 are positioned to funnel the lubricant to a specific point or points external of the gear enclosure 15. In the preferred embodiment the specific point where the lubricant is funneled is a spent lubricant drain line 28. When enough of the lubricant accumulates on the guards 26, gravity will force the spent lubricant to the spent lubricant drain line 28 where it will ultimately be conveyed to an spent lubricant holding tank 30.

Because the semi-fluid or higher viscosity lubricants used in these systems are sluggish and do not flow freely, they may tend to accumulate in the conduits or housing/guarding before draining into the spent lubricant holding tank 30. The lubricant will be forced into the spent lubricant holding tank 30 when enough spent lubricant accumulates on the channels or guards 26 of the housing 15 to force some into the spent lubricant holding tank 30 through gravity. Alternatively, should the housing 15 be pressurized to minimize the ingress of atmospheric contaminants, the air pressure in the housing 15 may be increased to assist the spent lubricant into the spent lubricant holding tank 30.

This system is different from any prior art oil recirculating system because there is no need for a continuous flow of spent lubricant to the spent lubricant holding tank 10 or bulk lubricant container 18 to maintain continuous, near continuous or intermittent lubrication of the machine components. Rather, it is preferable to transfer lubricant from the spent lubricant holding tank 30 to the bulk lubricant container 18 in batch fashion.

The spent lubricant can become excessively contaminated due to a process malfunction, equipment abuse, the accumulation of unacceptably high levels of wear debris, and the like, and require replacement with a new lubricant charge. When the spent lubricant is normally recirculated in batches with a substantial interval between batch transfers, the spent lubricant may be discarded and replaced during the period between two batch transfers of the lubricant from the tank 30 to the bulk lubricant container 18. This can be done, for example, by physically removing the spent lubricant tank 30 from the system. The removed spent lubricant tank 30 can be cleaned out, a fresh charge of semi-fluid lubricant can be added to the spent lubricant holding tank 30 or provided in a replacement tank, and the tank 30 or replacement tank can be installed in the recirculating system. The tank 30 or replacement tank can be installed before the next batch transfer is necessary, without interrupting the lubrication process.

The removal of contaminated lubricant and the addition of spent lubricant without interrupting the recirculating process is made possible by the insertion of at least one valve and at least one coupling in the line or conduit 32 between the spent lubricant holding tank 30 and the transfer pump 34. As shown in FIG. 1, an isolation valve 36 and a coupling 37 are preferably included between the spent lubricant holding tank 30 and the transfer pump 34, allowing the contaminated lubricant in the tank 30 to be removed from recirculation and replaced with clean fresh lubricant. The spent lubricant drain line 28 is also removable from the spent lubricant holding tank 30 by releasing the coupling 29 to allow removal and replacement of the lubricant.

At least one, and preferably a plurality, of lubricant level sensors 38 are contained in the spent lubricant holding tank 30. The lubricant level sensors 38 are in communication with the system controller 16 so that the level of spent lubricant in the spent lubricant holding tank 30 is continually monitored. When lubricant level sensors 38 detect that the level of spent lubricant contained in the tank 30 reaches a predetermined maximum, the controller will activate the transfer pump 34 so that spent lubricant is recirculated from the spent lubricant holding tank 30 to the bulk lubricant container 18. The transfer pump 34 is preferably a low volume, low shear pump. This type of pump is preferable as it minimizes the shear stress on semi-fluid lubricants. In a preferred embodiment, the spent lubricant holding tank 30 also contains sensors which detect when its level is at a predetermined minimum, and the controller 16 turns off the transfer pump 34 when the minimum is reached.

Upon activation of the transfer pump 34, spent lubricant is pumped from the spent lubricant holding tank through at least one filter 42 to remove solid impurities that may collect in the lubricant such as debris worn off from the gear 12, the pinion 14 or the other machine components. The filtration device generally will consist of a cleanable metal media element fitted within a suitable housing. However, there may be instances where the use of disposable filter elements will be preferred. In addition, from time to time the use of a cleanable magnetic device, mounted either upstream or downstream of the transfer pump 34, to remove large ferrous particles from the spent lubricant may be desirable.

Regardless of the filter 42 used, after the spent lubricant has been filtered, the now conditioned lubricant is conveyed through a lubricant return line 44 to the bulk lubricant container 18 for reapplication to the machine components.

At least one, and preferably a plurality, of lubricant level sensors 46 are contained in the bulk lubricant container 18. The lubricant level sensors 46 are in communication with the system controller 16 so that the level of lubricant in the bulk lubricant container 18 is continually monitored. When lubricant level sensors 46 detect that the level of spent lubricant contained in the tank 18 has dropped below a certain minimum, the controller 16 will activate the transfer pump 34 so that spent lubricant is drawn from the spent lubricant holding tank 30 and recirculated to the bulk lubricant container 18 by the lubricant return line 44.

In a preferred embodiment, the bulk lubricant container 18 also contains one or more sensors which detect when its level is at a predetermined maximum, and the controller 16 turns off the transfer pump 34 when the maximum level in the bulk lubricant container 18 or the minimum level in the spent lubricant holding tank 30 is reached.

As a result of the system controller 16 in connection with the lubricant level sensors 38 and 46, the lubricant is recirculated in batch fashion, not continuously, optimizing the components of the system and allowing the lubricant to be changed during operation of the machine. Because the lubricant is transferred in batch fashion, the transfer pump 34 does not need to run continuously. It only runs when activated by the controller 16 in response to the indications from the lubricant level sensors 38 and 46. This is an additional advantage, as it would be inefficient to run the transfer pump 34 continuously. There may be times when the spent lubricant holding tank 30 contains only a minimal amount of spent lubricant, or an insufficient amount of spent lubricant to pump.

Further, valves 50 and 52 are also preferably included in the system. The valve 50 is located upstream of the filter 42 or filters, and the valve 52 is located downstream of the filter 42 or filters to isolate each filter and facilitate cleaning and/or purging of the system.

FIG. 2 illustrates a more specific application of the present invention. FIG. 2 is a schematic of the present invention as incorporated into a steel mill electric arc furnace 60 to lubricate the cover lifting and rotating mechanism 62. The cover lifting and rotating mechanism is only one example of the type of mechanisms within which this invention can be incorporated or retrofitted.

Steel mill furnaces are used to melt metal for casting. In the preferred embodiment, the steel mill electric arc furnace 60 is used in connection with a continuous metal caster. These continuous metal casters are used to produce continuous ribbons of steel, as opposed to individually pouring many separate ingots of metal. The process begins with the generation of the proper composition of molten metal in the furnace. The molten metal is then transported rapidly from the furnace by a ladle and is fed directly to the tundish of a continuous caster. From there, the molten metal flows into moving, water-cooled molds where a continuous strand of steel is formed and then cut into pre-determined lengths.

The cover lifting and rotating mechanism as generally indicated by reference number 62 opens the furnace to allow the pouring of molten metal into a ladle for transport to the continuous caster. As with any moving parts, this mechanism and its parts must be lubricated to minimize friction and to prolong their use.

The cover of the furnace 61 is hydraulically opened by a hydraulic cylinder 64 in connection with a cover lift ram 66. After the cover has been lifted, it swings off the furnace about 90-120 degrees in connection with the upper bushings 70 and the lower bushings 72 allowing the ladle to retrieve some of the molten metal from the furnace 60.

These upper bushings 70, lower bushings 72, and lift ram 66 as well as the swing and other members of the mechanism 62 are lubricated by semi-fluid lubricants (greases) or high viscosity fluids (high viscosity base oil gels). Design restrictions may prevent complete enclosure of the cover lifting and rotating mechanism. Thus drip pans 74, guards, or channels are inserted below the upper bushings 70, the lower bushings 72, the lift ram 66, and other components to catch the lubricant as it falls therefrom. The mechanism is also preferably fitted with conduits or pipes (not shown) to convey the lubricant from the drip pans 74 to the other components of the system.

As in FIG. 1, the operation of the embodiment of the present invention as shown in FIG. 2 is controlled by a system controller 76 which is preferably a digital computer or a programmable logic controller (PLC). The system controller 76 controls and monitors the flow of lubricant to the upper bushings 70, the lower bushings 72, the lift ram 66 as well as the swing arm and other smaller members of the cover lifting and rotating mechanism 62. Thus, the present lubrication system can optionally be incorporated as part of the mechanism to be lubricated. As above, in the present embodiment the lubricant includes semi-fluid lubricants such as greases or higher viscosity lubricants such as high viscosity base oil gels.

The lubricant that is used to lubricate the system components is initially stored in a bulk lubricant container 78. The system controller 76 regulates and controls the application of lubricant from the bulk lubricant container 78 to the use points of the upper bushings 70, the lower bushings 72, the lift ram 66, and other smaller members of the cover lifting and rotating mechanism 62. The controller 76 allows for application of the lubricant in a continuous, near-continuous or intermittent fashion, depending upon the specifications of the system.

When the system is in operation, the controller 76 activates the lubricant supply pump 68, which pumps a pre-selected amount of lubricant from the bulk lubricant container 76 through a conduit 80 to a lubricant metering device or devices 82 which regulate the pressurized flow of lubricant. The lubricant supply pump is preferably a high pressure pump. As a result of the metering device 82, a controlled volume of lubricant is sprayed or otherwise introduced to the various components through spray nozzles or other orifices 84. The lubricant can also be applied to the components through the use of conduits or orifices which are well known in the art. There may also be multiple points of application, such as to the upper bushings 70, the lower bushings 72, and the lift ram 66, instead of a single point of application. Once the lubricant is introduced to the primary machine component(s), it may be conveyed via pipes or hoses (not shown) to other secondary components (not shown). After the lubricant has been applied to the machine components, spent lubricant will fall therefrom and collect in drip pans 74, in channels, or on other types of guards (not shown). These pans 74 or other guards and conduits are used to facilitate the collection of the spent lubricant.

The semi-fluid lubricants and high viscosity base oil gels do not have the flow characteristics of lower viscosity machine oils, thus the drip pans 74 are designed to funnel the lubricant to the conduits or hoses (not shown) for conveyance to other components or to a specific point or points external of the mechanism such as a sump. In the preferred embodiment the specific point where the lubricant is funneled is a spent lubricant drain line 88. When enough of the lubricant accumulates in the drip pans 74 or guards, gravity will force the spent lubricant to the spent lubricant drain line 88 where it will ultimately be conveyed to an spent lubricant holding tank 90 or sump.

Because these semi-fluid or higher viscosity lubricants used in these systems are sluggish and do not flow freely, they may tend to accumulate in the conduits or housing/guarding before draining into the spent lubricant holding tank 90. The lubricant will be forced into the spent lubricant holding tank 90 when enough spent lubricant accumulates in the drip pans 74 or other guards to force some into the spent lubricant holding tank 90 through gravity.

This system is different from any prior art oil recirculating system because there is no need for a continuous flow of spent lubricant to the spent lubricant holding tank 90 or bulk lubricant container 78 to maintain continuous, near continuous or intermittent lubrication of the machine components. Rather, it is preferable to transfer lubricant from the spent lubricant holding tank 90 to the bulk lubricant container 78 in batch fashion. By transferring the spent lubricant form the spent lubricant holding tank 90 to the bulk lubricant container 78 in batch fashion, spent lubricant which may become excessively contaminated due to a process malfunction, equipment abuse, the accumulation of unacceptably high levels of wear debris, and the like, may be removed from the system, and a fresh charge of clean semi-fluid lubricant added to the recirculating system, without interrupting the lubrication process.

The removal of contaminated lubricant and the addition of spent lubricant without interrupting the recirculating process is made possible by the insertion of at least one valve in the line or conduit 92 between the spent lubricant holding tank 90 and the transfer pump 94 as discussed above in connection with FIG. 1. This valve is preferably located between the spent lubricant holding tank 90 and the transfer pump 94, allowing the contaminated lubricant in the tank 90 to be removed from recirculation and replaced with clean fresh lubricant. The spent lubricant drain line 88 is also removable from the spent lubricant holding tank 90 to allow removal and replacement of the lubricant.

A plurality of lubricant level sensors 96 are contained in the spent lubricant holding tank 90. The lubricant level sensors 96 are in communication with the system controller 76 so that the level of spent lubricant in the spent lubricant holding tank 90 is continually monitored. When lubricant level sensors 96 detect that the amount of spent lubricant contained in the tank 90 reaches a specified level or gets too high, the controller will activate the transfer pump 94 so that spent lubricant is recirculated from the spent lubricant holding tank 90 to the bulk lubricant container 78. The transfer pump 94 is preferably a low volume, low shear pump. This type of pump is preferred to minimize the shear stress on semi-fluid lubricants.

Upon activation of the transfer pump 94, spent lubricant is pumped from the spent lubricant holding tank through at least one filter 98 to remove solid impurities that may collect in the lubricant such as debris worn off from the upper bushings 70, the lower bushings 72, the lift ram 66, and the other machine components. The filtration device generally will consist of a cleanable metal media element fitted within a suitable housing. However, there may be instances where the use of disposable filter elements will be preferred. In addition, from time to time the use of a cleanable magnetic device, mounted either upstream or downstream of the transfer pump 94, to remove large ferrous particles from the spent lubricant may be desirable.

Regardless of the filter 98 used, after the spent lubricant has passed therethrough, the now conditioned lubricant is conveyed through a lubricant return line 100 to the bulk lubricant container 78 for reapplication to the machine components.

A plurality of lubricant level sensors 102 are contained in the bulk lubricant container 78. The lubricant level sensors 102 are in communication with the system controller 76 so that the level of lubricant in the bulk lubricant container 78 is continually monitored. When lubricant level sensors 102 detect that the level of spent lubricant contained in the tank 78 is below a minimum valve (i.e. gets to low), the controller 76 will activate the transfer pump 94 so that spent lubricant is drawn from the spent lubricant holding tank 90 and recirculated to the bulk lubricant container 78 by the lubricant return line 100.

As mentioned, a valve (not shown) is contained downstream of the Spent lubricant holding tank 90 and upstream of the transfer pump 94. Further two additional valves (not shown) are also preferably included. The first valve is located upstream of the filter or filters 98, and the second valve is located downstream of the filter or filters 94 to isolate each filter and facilitate cleaning and/or purging of the system.

This invention has been described above with reference to a preferred embodiment. Modifications and alterations may become apparent to one skilled in the art upon reading and understanding this specification. It is intended to include all such modifications and alterations within the scope of the appended claims.

I claim:

1. A system for delivering and recirculating high viscosity lubricants in a mechanism requiring lubrication, said system comprising:
   a bulk lubricant container for holding a clean lubricant;
   at least one orifice for applying the clean lubricant to at least one use point of said mechanism;
   at least one guard for collecting and channeling the spent lubricant which escapes from said at least one use point;
   a spent lubricant holding tank for receiving and containing the spent lubricant channeled from said guard;
   a transfer pump for conveying the spent lubricant from said spent lubricant holding tank through a filter for removing impurities and returning the clean lubricant to said bulk lubricant container;
   a first sensor for signalling when the level of said clean lubricant contained in said bulk lubricant container is less than a predetermined minimum;
   a second sensor for signalling when the level of spent lubricant contained in said spent lubricant tank is greater than a predetermined maximum; and
   a controller for monitoring the readings from said first and second sensors and activating said transfer pump when the level of the spent lubricant in said spent lubricant tank exceeds said predetermined maximum or the level of the clean lubricant in said bulk lubricant container is less than said predetermined minimum.

2. The system of claim 1 wherein said transfer pump is a low pressure low volume pump.

3. The system claim of claim 1 further including a plurality of said guards and a spent lubricant drain line for conveying the spent lubricant from said plurality of guards to said spent lubricant holding tank.

4. The system of claim 3 further including conduits for conveying the lubricant to plural components of the mechanism.

5. The system of claim 1 further comprising a source of pressure to assist the movement of the spent lubricant collecting on said guard to said spent lubricant holding tank.

6. The system of claim 1 further including a magnetic device located adjacent said transfer pump for removing ferrous particles from the spent lubricant.

7. The system of claim 1 wherein the spent lubricant is transferred to said bulk lubricant container in batch fashion.

8. The system of claim 7, further comprising a valve and couplings located for facilitating removal of the spent lubricant holding tank from said system for removal of the spent lubricant and replacement with additional clean lubricant.

9. A system for recirculating high-viscosity lubricants in batch fashion comprising:
   a controller for monitoring and controlling the flow of lubricant through the system;
   at least one bulk lubricant container;
   a first pump associated with said controller for removing a controlled amount of said lubricant from said bulk lubricant container for lubricating at least one component of a mechanism requiring lubrication;
   at least one orifice for applying said lubricant to said at least one component of the mechanism;
   a spent lubricant holding tank for collecting spent lubricant after application to said at least one component of the mechanism;
   at least one level sensor located in each of said bulk lubricant container and said spent lubricant holding tank, said level sensors associated with said controller for monitoring the level of lubricant contained in both said bulk lubricant container and said spent lubricant holding tank; and
   a second pump associated with said controller for pumping the spent lubricant from said spent lubricant holding tank through at least one filtering device to said bulk lubricant container when said bulk lubricant container is depleted.

10. The system of claim 9 further comprising a valve located downstream of the spent lubricant holding tank allowing removal of the spent lubricant from said system and replacement with clean lubricant.

11. The system of claim 9 further comprising a plurality of valves located on either side of said plurality of filters allowing removal and replacement thereof from said system.

12. The system of claim 9 wherein said plurality of sensors in said bulk lubricant container and said plurality of sensors in the spent lubricant holding tank are associated with said controller for facilitating the transfer of lubricant and spent lubricant when required.

13. The system of claim 9 further comprising a metering unit for regulating the pressure of said lubricant applied to said at least one component of a mechanism requiring lubrication.

14. The system of claim 9 further comprising pans associated with said various mechanism components for collecting the spent lubricant after application thereto.

15. The system of claim 9, further comprising a cover lifting and rotating mechanism of an electric arc furnace as the component of a mechanism requiring lubrication.

16. The system of claim 15 further comprising conduits for conveying said lubricant to said various mechanism components.

17. A method for delivering and recirculating high viscosity lubricants comprising the steps of:
   holding in a bulk lubricant container clean lubricant to be applied to at least one use point of a mechanism requiring lubrication;
   applying the clean lubricant from said bulk lubricant container to at least one use point of the mechanism;
   collecting the spent lubricant which escapes from the at least one use point;
   channeling the spent lubricant to a spent lubricant holding tank;
   determining when the level of said clean lubricant contained in said bulk lubricant container is less than a predetermined minimum;
   determining when the level of spent lubricant contained in the spent lubricant tank is greater than a predetermined maximum;
   conveying the spent lubricant from the spent lubricant holding tank through a filter for removing impurities; and
   returning said clean lubricant from said spent lubricant tank to said bulk lubricant container when the level of the spent lubricant in the spent lubricant tank exceeds said predetermined maximum or the level of clean lubricant in said bulk lubricant container is less than said predetermined minimum.

* * * * *